United States Patent [19]

Leal

[11] Patent Number: 4,885,867
[45] Date of Patent: Dec. 12, 1989

[54] SIMULATED FROG FISHING LURE

[76] Inventor: Vitervo Leal, 4744 N. Whipple, Chicago, Ill. 60625

[21] Appl. No.: 261,348

[22] Filed: Oct. 24, 1988

Related U.S. Application Data

[63] Continuation-in-part of Ser. No. 121,093, Nov. 6, 1987, abandoned.

[51] Int. Cl.⁴ .............................................. A01K 85/00
[52] U.S. Cl. .................................. 43/42.26; 43/42.02; 43/42.28; 43/42.24
[58] Field of Search ................. 43/42.02, 42.26, 42.28, 43/42.3, 42.39, 42.24

[56] References Cited

U.S. PATENT DOCUMENTS

| | | | |
|---|---|---|---|
| 2,690,026 | 9/1954 | King | 43/42.02 |
| 2,927,392 | 3/1960 | Lievense | 43/42.28 |
| 3,037,316 | 6/1962 | DeZeeuw | 43/42.28 |
| 3,105,317 | 10/1963 | Fox | 43/42.26 |
| 3,349,513 | 10/1967 | Jeff | 43/42.02 |
| 4,316,343 | 2/1982 | Greme | 43/42.28 |
| 4,619,069 | 10/1986 | Strickland | 43/42.28 |

FOREIGN PATENT DOCUMENTS 700202 12/1964 Canada ............................... 43/42.02

Primary Examiner—Kurt Rowan
Attorney, Agent, or Firm—Basil E. Demeur; Alan B. Samlan; Robert E. Knechtel

[57] ABSTRACT

There is disclosed an improved fishing lure which is formed by a simulated frog-like body, the body including an anchoring point for a fishing line at the forward end thereof, and a novel tail structure located at the opposed end of the body, the tail structure consisting of a pliable and flexible coiled structured formed of a material having a memory thereby permitting the coiled structure to achieve a bellows action during the lure manipulation causing a circular vibrational motion of the water as the lure travels through the water for the purpose of attracting fish. The tail structure is formed of a material which normally biasingly urges the tail into a tightened bellows configuration when not in use, and uncoils in a bellows fashion and creates a circular vibratory motion during use, the tail material having a self memory thereby to biasingly urge the tail back into its tightened bellows configuration.

5 Claims, 1 Drawing Sheet

U.S. Patent
Dec. 12, 1989
4,885,867
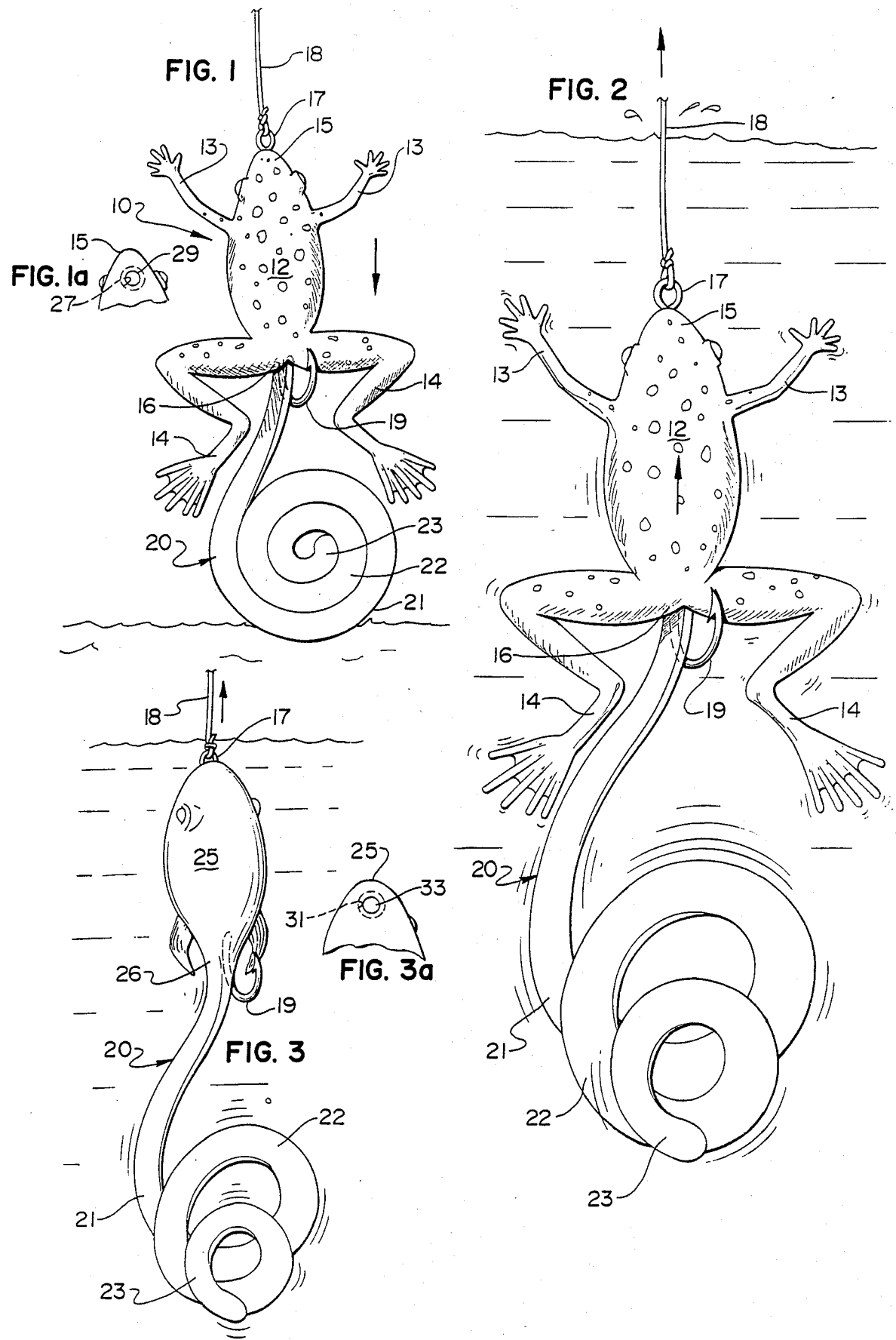

SIMULATED FROG FISHING LURE

REFERENCE TO RELATED APPLICATION

This application is a continuation-in-part application of a pending application filed on Nov. 16, 1987 under Ser. No. 121,093, now abandoned and titled "Simulated Frog Fishing Lure" in the name of Vitervo Leal.

BACKGROUND OF THE INVENTION

The present invention relates to an improved type of fishing lure. The lure of the present invention is intended to simulate a naturally occurring organism which is known to be a natural food source for a variety of fish.

The art with respect to fishing lures is quite extensive. Numerous lures have been invented and developed over time, all of which have the main purpose of attempting to attract and catch fish. Hence, it is well known that lures containing bright metallic surfaces, feathered, surfaces, and the like have been developed as have lures having moving parts intended to result in a certain type of water movement when pulled through the water for the purpose of attracting fish. There is also a host of lures which have been developed simulating various types of organisms, such as minnows and the like, or other types of organisms wherein it is known that they are the food source for various species of fish. In most instances, such lures are formed of a pliable plastic material, and painted with a view toward simulating the natural occurring species for which the lure is intended to simulate. A good example of such types of lures are the ones that simulate minnows, small water snakes, and the like. It is well known that these types of species, when naturally occurring, are a food source for varieties of fish such as perch, salmon, and other similar species.

In terms of the most pertinent patented prior art, patent no. 3,349,513 illustrates a fishing lure which is formed of a pliable material in the form of an earthworm, eel or similar species. As is typical of the prior art lures, the tail section includes a coil tail, which as illustrated in FIG. 2 of the subject drawings, will uncoil during the pulling action as the same is pulled through the water. Indeed, the tail assumes an almost straight configuration since the coil almost totally uncoils as it is pulled, which necessarily means that a circular vibratory motion cannot be induced by such a tail since it is uncoiled into almost a straight format. Similar comments are applicable with respect to the fishing lure shown in patent no. 2,690,026, wherein the fishing lure shown therein is in the format of a small snake or eel, and again is made of a pliable material such that when pulled through the water as generally illustrated in FIG. 2 of the drawings, causes the body section to substantially flatten out the present a straight body section in the water. Again, once the coiled body section uncoils during the pulling action, it is not possible to set up the proper vibratory movement in order to make the lure an attractive food source to fish. Similar prior art problems are evident with respect to patent no. 3,037,316 which again shows a lure body wherein a pair of coiled sections are incorporated in the tail section. As shown in FIG. 2 of the drawings therein, incident to the pulling action of the lure, the coiled body sections basically flatten out, and do not maintain their coiled or bellows configuration in order to set up the proper vibratory action in the water. Canadian patent no. 700,202, again shows a lure in the form of a snake or eel or other similar species, which is precoiled, but uncoils during the pulling action. As shown in FIG. 2 of the Canadian patent, when pulled through the water, the body section basically uncoils and therefore, cannot achieve a proper circular vibratory movement of the lure as it moves through the water.

The present invention differs from the prior art in that the present invention contemplates the provision of a lure wherein the tail section is formed in a bellows-like configuration, which maintains a tightened bellows configuration when at rest, but when pulled through the water, expands into an expanded bellows type configuration, maintaining at all times the bellows configuration. By maintaining the bellows configuration, a circular vibratory pattern to the water is created which is believed to be far more attractive to the fish species attempting to be caught than the prior art lures are able to achieve. It is further to be noted that with respect to the present invention, the lure body may be altered in that different formats of species may be employed, so long as the proper bellows-type tail section is incorporated with respect to the body section. The present invention contemplates the use of a frog and/or tadpole species for the lure in that it is intended that the present lure be primarily used for varieties of fish such as perch, salmon and other similar species which feed upon tadpoles and frogs.

The present invention is intended to provide a lure which simulates the body of a frog in its various stages of development, but which further includes a novel tail section intended to provide a circular vibratory motion when dragged through the water for the purpose of attracting fish. The lure is provided with a body section simulating a frog or a tadpole, the tadpole being a stage of development of the frog. Indeed, tadpoles represent the stage of development wherein the frog is approximately 2 weeks old, whereas the full frog body is the fully developed frog which occurs some number of weeks thereafter. Plasticized frog bodies have been known in the art, and have been utilized as sythetic lures, but have not been particularly successful as lures in terms of fishing. It is, however, well known that tadpoles and frogs are in fact a food source for a variety of fish species, and it was determined that in order for such lures to be operationally successful, a device creating a vibratory motion when the lure is pulled through the water must be incorporated in order for the lure to be successful. The present invention contemplates utilizing a plasticized body section simulating a frog or tadpole, which incorporates therein a coiled tail section formed of a plastic material, which will achieve a bellows action when pulled through water in order to create a circular vibratory motion and has a self-memory to return to its tightened bellows position when at rest. The intention is that the tail section be formed of a plasticized material which will normally biasingly urge the tail into a tight bellows configuration when the lure is still, but will achieve an expanded bellows configuration as the lure is pulled through the water in order to trail behind the lure and create a circular vibratory motion to attract fish.

BRIEF SUMMARY OF INVENTION

Hence, in summary, the present invention is intended to utilize the commonly known plasticized body sections of a frog or tadpole species, and to provide therewith a device which will be useful in creating a motion of the water for the purpose of attracting fish. The present invention provides a plasticized tail section which is configured in a normally tight bellows disposition when in the still position, but will expand in a bellows action and create a circular vibratory motion behind the body section of the lure as the lure is pulled through the water. The type of motion created by the tail section operates and functions to attract fish to the lure, the main body of the lure then containing the fish hook, such that when the fish observe the motion of the lure and seek to pray upon the food source, it will be caught by the hook.

OBJECTS AND ADVANTAGES

It is therefore the principal object of the present invention to utilize a simulated frog body section of the type commonly known, and to incorporate therein a device which creates a motion for the purpose of attracting fish.

In conjunction with the foregoing object, it is another object of the invention to provide a lure of the type described wherein the attraction device consists of a bellows tail section fixedly secured to the rear portion of the lure such that during the pulling motion of the lure, the bellows tail section will expand, and will trail the lure body through the water creating and setting up a circular vibratory motion for the tail section.

In conjunction with the foregoing objects, it is a further object of the present invention to provide a lure of the type described, wherein the bellows tail section is formed of a plasticized material which is manufactured such that the tail section has a memory and will remain in a normally tight bellows disposition at a rest position, but will be sufficiently pliable such that during the pulling procedure, the bellows tail section will expand by bellows action and create a circular vibratory motion as pulled through the water.

Further features of the invention pertain to the particular arrangement of the parts whereby the above outlined and additional operating features thereof are attained.

The invention, both as to its organization and method of operation, together with further objects and advantages thereof, will best be understood by reference to the following specification taken in connection with the accompanying drawings.

BRIEF DESCRIPTION OF DRAWINGS

FIG. 1 is a plan elevational view illustrating the simulated frog body having a bellows tail section formed thereon and integral therewith, in its normally resting position;

FIG. 1A is a bottom view, partly broken away, showing the forward portion of the head section, including a pouch for containing a weight utilized for stabilizing the lure;

FIG. 2 is a plan elevational view showing the lure body of FIG. 1 as the same is pulled through the water illustrating the expanding bellows action of the tail section to create a circular vibratory motion thereof for the purpose of attracting fish;

FIG. 3 is a plan elevational view showing the lure body wherein there is utilized a simulated tadpole body section incorporating a similar bellows like tail section which expands by bellows action as pulled through the water setting up a circular vibratory motion; and FIG. 3A is a bottom view, partly broken away, showing the forward portion of the simulated tadpole body section including a pouch having a weighted element positioned therein for stabilizing the lure during use.

DETAILED DESCRIPTION OF DRAWINGS

With specific reference to FIGS. 1 and 2 of the drawings, the lure of the present invention is illustrated in its complete format. As illustrated therein, the lure 10 is shown to be formed by simulated frog body section 12 which simulates in great detail the exact body section of the frog. This includes the forward legs 13, and rear legs 14, as well as the head section 15. The head section 15 includes a mounting ring 17 which is fixedly secured thereto, and is intended to provide a mounting point for the fishing line 18. The mounting ring 17 extends through the body section terminating in a fishing hook 19 in a manner commonly known in the art.

The frog body section 12 includes a rear section 16 from which the fishing hook 19 emerges, and further includes the bellows-like tail section 20 of the present invention. As illustrated in FIGS. 1 and 2 of the drawings, the bellows tail section 20 is fixedly secured to the rear section 16 of the frog body section 12, and in its normal resting position, is shown to have a length sufficient to have approximately 3 coils denoted by the numerals 21, 22 and 23. The tail section 20 is formed of a plastic material which has a self-memory such that the material will normally biasingly urge the coils into the tight bellows configuration illustrated in FIG. 1. The material from which the tail section is formed is sufficiently pliable, such that when the lure 10 is pulled through the water incident to the normal fishing procedure, the bellow-like tail section 20 will expand in a bellows manner as illustrated in FIG. 2 of the drawings. In this position, the first, second and third coils of the bellows-like tail expand into an expanded bellows tail section and trail the lure body 10. As illustrated in FIG. 2 of the drawings, this action will set up a circular vibratory motion of the tail section 20 which functions as an attraction point for the various fish species which feed upon frogs as a food source. As further illustrated in FIG. 2 of the drawings, the frog lure body 12 also includes the forward legs 13 and rear legs 14, which will also provide some degree of motion as the lure is pulled through the water (in the direction of the arrows as shown in FIG. 2), which further serves to attract fish, although this motion is secondary to the motion created by the bellows tail section 20. It will be noted that the fishing hook 19 is located adjacent the rear section 16 such that once the fish species is attracted, and attempts to engulf the frog body 12, the fish will be hooked.

In FIG. 3 of the drawings, the lure is altered only to the extent that instead of using a fully formed simulated frog body as the main portion of the lure, the main body section simulates the frog in its tadpole stage of development. Hence, the main body section of the lure is shown to be formed by a simulated tadpole 25 which is known to also serve as a food source for various species of fish. In all other respects, the lure as shown in FIG. 3 of the drawings otherwise is identical to the lure of the present invention in that the same includes a bellows-like tail section 20 having a series of first, second and third coil sections 21, 22 and 23 respectively. Once again, the fishing hook 19 is positioned adjacent the rear section 26 of the tadpole body section 25, in order to engage and catch the fish once the fish is attracted to the lure.

As further illustrated in FIG. 3 of the drawings, the pulling motion of the lure 25 through the water will cause the expansion of the bellows tail section 20, and set up a circular vibratory motion of the tail as an attraction feature to attract fish thereto.

With respect to FIGS. 1A and 3A of the drawings, it has also been found that in order to have the lure properly operate when traveling through the water, the underside of the head section of the lure must be properly weighted. With specific reference to FIG. 1, the forward portion of the head section 15 is shown to include a pouch 27 into which a weight element 29 is positioned. The weight element 29 is maintained in place by simply filling the poush 27 with the same material from which the body section 12 is formed, such that the weight element 29 remains in place. As shown in FIG. 3A of the drawings, the tadpole body section 25 is similarly constructed to contain a pouch 31 in which a weight element 33 is positioned. Once again, the weight element 33 is maintained in place by filling the pouch 31 with the same material from which the tadpole body section is created.

It has been found that by having the weights positioned along the underside of the body sections of the lure, as the lure is pulled through the water, the weight will cause the lure to maintain stability in keeping the lure body in the upright position and prevent the lure body from spinning. This action has an impact on the proper functioning of the bellows tail section 20 in that the improper rotational movement of the entire body section will similarly cause the tail section 20 to gyrate in a circular motion. Hence, the inclusion of the weight elements 20 and 33 respectively function to render the lure properly operational during use.

In terms of materials, it is contemplated that the entire lure may be formed of a plastic material such as an ethylene based plastic, of the type commonly used for plastic fishing lures. The materials are well known in the art, and are in fact presently used on a wide variety of lures. The important feature of the material utilized for purposes of the present invention is that the bellows tail section 20 be formed of a plasticized material which has a self memory to return to its rest position with the bellows tail section in a tightened position, but to be sufficiently pliable to expand readily and easily as the lure is pulled through the water while still maintaining a bellows-like configuration so that the tail section will train the lure body during the pulling motion, and set up a circular vibratory motion. It has been found that materials such as silicone rubber, vinyl plastics, and other similarly flexible materials can be easily utilized to create the tail section portion of the lure and will function well for the purpose intended.

While there has been described what is at present considered to be the preferred embodiments of the invention, it will be understood that various modifications may be made therein and is intent to cover in the appended claims all such modifications as fall within the true spirit and scope of the invention.

I claim:

1. An improved fishing lure comprising
    a simulated frog body section of the type having a forward end including a fishing line mounting ring and a rear section,
    a fishing hook mounted on said rear section of said frog body section, and a rear bellows-like tail section having a plurality of coil sections,
    said bellows-like tail section retaining a coiled configuration in the rest position and in the expanded position and avoiding an extended linear configuration when water pressure is applied there against,
    said rear bellows-like tail section formed of a plasticized material which has a self-memory to maintain a tightened bellows configuration when at rest and is sufficiently pliable to expand into an expanded bellows configuration in response to the application of water pressure there against,
    said rear bellows-like tail section creating a circular vibratory motion when in the expanded disposition during use.

2. The improved fishing lure set forth in claim 1 above, wherein said rear bellows-like tail section includes at least two coil sections.

3. The improved fishing lure as set forth in claim 1 above, wherein said rear bellows-like tail section is formed of a plastic resin material selected from the group consisting of silicone rubber and vinyl plastic, having a self-memory to return to a tightened bellows configuration when at rest.

4. The improved fishing lure as set forth in claim 1 above, wherein said simulated body section includes a pouch positioned along the bottom portion of the forward end thereof, and a weight element positioned within said pouch and sealed in place with a sealing material.

5. The improved fishing lure comprised of
    a simulated frog body section of the type having a forward end including a fishing line mounting ring and a rear section,
    said forward end including a pouch positioned along the underside thereof,
    said pouch including a weight element positioned therein and sealingly engaged within the confines of said pouch,
    a fishing hook mounted on said rear section of said frog body section,
    a rear bellows-like tail section having a plurality of at least two coil sections,
    said rear bellows-like tail section being formed of a plastic resin material having a self-memory selected from the group consisting of silicone rubber and vinyl plastic, which material will retain a coiled configuration in the rest position and in the expanded position and avoid an extended linear configuration when water pressure is applied there against and biasingly urge said coil sections into a tightened bellows configuration when in the rest position and is sufficiently pliable to expand into an expanded bellows configuration in response to the application of water pressure there against,
    said bellows-like tail section when expanded, creating a circular vibratory motion during use.

* * * * *